(12) United States Patent
Graves et al.

(10) Patent No.: US 8,504,787 B1
(45) Date of Patent: Aug. 6, 2013

(54) TECHNIQUES FOR DETERMINING DATA PROTECTION STORAGE REQUIREMENTS

(75) Inventors: Tyler M. Graves, Framingham, MA (US); Alexander C. McLeod, North Reading, MA (US); Paul Tynan, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 691 days.

(21) Appl. No.: 12/661,911

(22) Filed: Mar. 26, 2010

(51) Int. Cl.
*G06F 13/00* (2006.01)
*G06F 13/28* (2006.01)

(52) U.S. Cl.
USPC .......................................... 711/162; 711/171

(58) Field of Classification Search
USPC ......................................... 711/161–163, 171
See application file for complete search history.

(56) References Cited

U.S. PATENT DOCUMENTS 7,159,072 B2 * 1/2007 Kitamura ...................... 711/112
7,676,510 B1 * 3/2010 Karinta ......................... 707/654

OTHER PUBLICATIONS

Technical Report: Microsoft SQL Server and IBM System Storage N series with SnapDrive, Document NS3247-0, Sep. 24, 2007.*
Enabling Rapid Recovery with SnapVault, Darrin Chapman et al, Nov. 2003.*
IBM System Storage N series SnapVault Best Practices Guide, Alex Osuna et al, 2007.*

* cited by examiner

*Primary Examiner* — Matthew Bradley
*Assistant Examiner* — Rocio Del Mar Perez-Velez
(74) *Attorney, Agent, or Firm* — Muirhead and Saturnelli, LLC

(57) ABSTRACT

Described are techniques for determining storage requirements for data protection. An initial size of a data protection area is determined. The data protection area provides storage for data obtained as a result of performing a data protection process for a first data area. The initial size is determined as a mathematical product of a first size of the first data area for which data protection is performed, a retention time, and a rate of change. Monitoring for an occurrence of one of a plurality of trigger events is performed. In response to an occurrence of one of the plurality of trigger events, it is determined whether an adjustment to a current size of the data protection area is needed.

19 Claims, 9 Drawing Sheets

TECHNIQUES FOR DETERMINING DATA PROTECTION STORAGE REQUIREMENTS

BACKGROUND

1. Technical Field

This application generally relates to data storage, and more particularly to techniques used in connection with storage requirements for data protection.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Storage space is allocated for storing a primary set of user data. Additional storage may be used in connection with providing data protection for the primary set of data. Data protection may be provided by a data protection process used to facilitate obtaining copies of data, or portions thereof, at one or more points in time. Examples of data protection techniques include snapshot and data replication facilities. The copy of data provides "protection" in that the copy may be used upon the occurrence of an event causing data failure, for example, when the primary or original data is destroyed, corrupted, or otherwise unavailable. A user may make a determination as to what amount of storage is allocated or provisioned for use with data protection both initially and over time. Additionally, monitoring and adjusting the amount of storage allocated for data protection may be performed manually by a user. The foregoing has drawbacks, for example, in that it is reliant on the user's availability and reliance to keep up with ongoing monitoring and adjustment to ensure that a proper amount of storage is allocated for data protection purposes. The foregoing is also dependent on the user's knowledge and abilities to make appropriate assessments as to when adjustments are needed as well as an amount for any adjustment. Additionally, the amount of storage needed for data protection may vary over time further adding complexity. If the user does not allocate additional storage for data protection until current storage allocations for data protection are exhausted, there is a potential for data loss since data protection processing may cease until such additional storage is allocated. Also, allocating too much additional storage for data protection contributes to inefficient storage utilization.

SUMMARY OF THE INVENTION

In accordance with one aspect of the invention is a computer-implemented method of determining storage requirements for data protection. Received is a first size of a first data area for which data protection is performed, wherein data obtained as a result of performing a data protection process for the first data area is stored in a data protection area. Also received is a retention time representing an amount of time data obtained as a result of performing the data protection process is retained. Also received is a rate of change representing a rate at which data in the first data area changes. A first value is determined which is based on said first size, said retention time, and said rate of change, said first value representing a calculated size of the data protection area. Storage for the data protection area having a size of said first value is allocated. The size of the data protection area is adjusted in response to an occurrence of a trigger event. The first value may be determined as a product of the retention time, the rate of change and the first size. The rate of change may be represented as a percentage value. The retention time may be a parameter of a retention policy. The method may also include repeating said determining step in response to said occurrence of said trigger event. The trigger event may be one or more of: a change to the retention time, a change to the rate of change, and a change to the first size. The method may also include determining whether there has been a significant change to one or more of: the retention time, the rate of change, and the first size, said significant change being determined in accordance with one or more thresholds. The method may also include repeating said determining step and obtaining an updated version of said first value based on current values for said first size, said retention time, and said rate of change; determining whether the updated version of the first value is less than said first value; and if the updated version of the first value is significantly less than the first value, increasing the size of the data protection area in accordance with said updated version of the first value. The method may also include if the updated version of the first value is significantly more than the first value and an adjustment to the size of the data protection area has not been made within a threshold amount of time, decreasing the size of the data protection area in accordance with said updated version of the first value. The rate of change may be based on previously observed data changes made with respect to the first data area. The rate of change may be based on a default value. The rate of change may be obtained at a first point in time and the method may further comprise recalculating said rate of change at a second point in time based on an amount of data changes to the first data area since said first point in time. The data protection process may obtain a snapshot of the first data area at different points in time in accordance with a data protection schedule.

In accordance with another aspect of the invention is a computer-implemented method of determining storage requirements for data protection. An initial size of a data protection area is determined. The data protection area has storage used for storing data obtained as a result of performing a data protection process for a first data area. The initial size is determined as a mathematical product of a first size representing a size of the first data area for which data protection is performed, a retention time representing an amount of time data obtained as a result of performing the data protection process is retained, and a rate of change representing a rate at which data in the first data area changes. Storage for the data protection area having a size of said initial size is allocated. Monitoring for an occurrence of one of a plurality of trigger events is performed. In response to an occurrence of one of the plurality of trigger events, it is determined whether an adjustment to a current size of the data protection area is needed. The method may also include determining an amount of the adjustment if it is determined that an adjustment to the current size is needed. The plurality of trigger events may include a change to one or more of the retention time, the rate of change, and the first size. Determining whether an adjustment is needed may be performed using one or more threshold values. The determining step may include recalculating a size for the data protection area using current values for size of the first data area, the rate of change, and the retention time; and comparing the size of the data protection area determined by said recalculating to a current size of the data protection area.

In accordance with another aspect of the invention is a computer readable medium comprising code stored thereon for determining storage requirements for data protection, the computer readable medium comprising code stored thereon that: determines an initial size of a data protection area having storage used for storing data obtained as a result of performing a data protection process for a first data area, said initial size being determined as a mathematical product of a first size representing a size of the first data area for which data protection is performed, a retention time representing an amount of time data obtained as a result of performing the data protection process is retained, and a rate of change representing a rate at which data in the first data area changes; allocates storage for the data protection area having a size of said initial size; monitors for an occurrence of one of a plurality of trigger events; and in response to an occurrence of one of the plurality of trigger events, determines whether an adjustment to a current size of the data protection area is needed. The computer readable medium may further comprise code that determines an amount of the adjustment if it is determined that an adjustment to the current size is needed. The plurality of trigger events may include a change to one or more of the retention time, the rate of change, and the first size.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
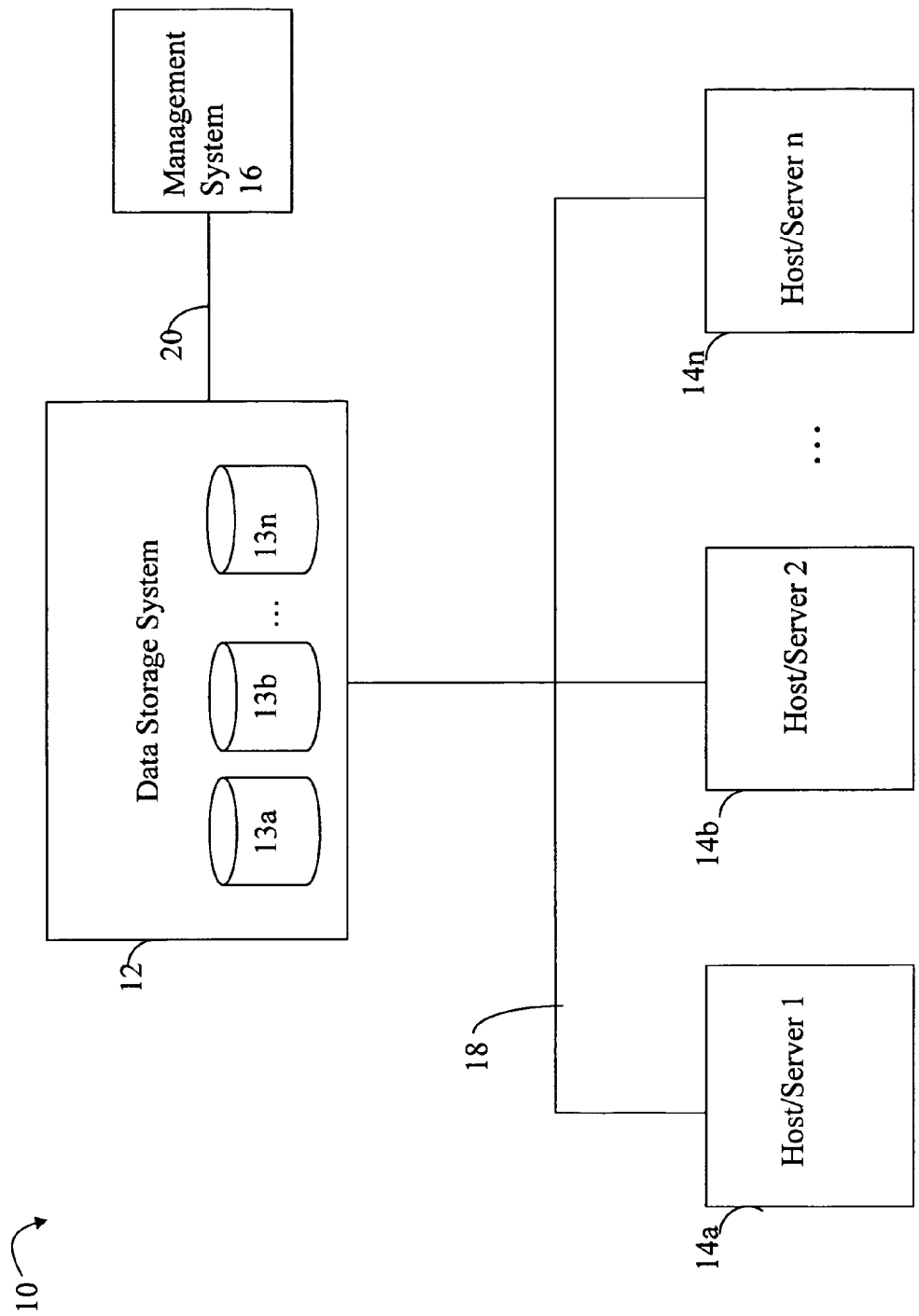
FIG. 1 is an example of an embodiment of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may include hardware and software for hosting the data storage of the one or more applications executing on the hosts 14a-14n. The systems 12 may each include one or more storage processors and one or more devices upon which data is stored. Data storage administration tasks may be performed for the system 12 storing the data of the hosts. Such tasks may include provisioning or allocating the data storage for use by the hosts and/or applications, backing up data from the storage system, and the like. As an example in connection with an email application server component that may executed on the hosts 14a-14n, the data storage configuration tasks may include allocating storage for user accounts or mailboxes, specifying the devices (logical and/or physical) used to store the email data, specifying what data protection process and selected facility or tool is used, specifying a schedule and/or retention policy for data protection, and the like.

The data storage systems 12 may include one or more data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a sizes, arrangements, products, and the like, which are exemplary. However, it will be appreciated by those skilled in the art that this is for purposes of illustration and should not be construed as a limitation of the techniques herein.

Storage may be allocated and used on the data storage system for a primary or working set of user data. Additionally, storage may be allocated and used in connection with providing data protection. Data protection may be provided by performing a data protection process using any one or more different data protection methods. The data protection process may be used to facilitate obtaining copies of data, or portions thereof, at one or more points in time. Examples of data protection techniques include snapshot and data replication facilities. The copy of data provides "protection" in that the copy may be used upon the occurrence of an event causing data failure, for example, when the primary or original data is destroyed, corrupted, or otherwise unavailable. Using the techniques described herein, a determination may be made as to what amount of storage is allocated or provisioned for use with data protection. The techniques herein provide for automatic and dynamic determination of data protection storage requirements by monitoring and adjusting the amount of storage allocated for data protection over time. The monitoring and adjustments may be performed proactively in an efficient manner so as to avoid under-allocating and over-allocating storage for data protection.

The techniques herein may be used in connection with a variety of different data protection techniques. For example, an embodiment using the techniques herein may use data protection methods including providing snapshots of a data set at various points in time. Celerra SnapSure™ is an example of a commercial product by EMC Corporation which may be used to obtain snapshots of data in an embodiment utilizing the techniques herein. In connection with a snapshot, data changes are recorded with respect to a data set at a particular point in time. Using one snapshot technique which may be referred to as "copy on write", a data set may serve as a read-only base copy against which subsequent modifications are recorded, such as using a write log. When performing the data protection operation using this particular snapshot technique, the subsequent changes as included in the foregoing write log may be stored on a device allocated for data protection storage. In order to perform recovery, the base copy or data set is needed as well as the copy of the stored write log data. It should be noted that there are other techniques that may be used in connection with obtaining snapshots than as described herein.

With snapshots as described above, the storage allocated for data protection may be used to store data for the one or more snapshots where such data may take the form of files or logs of recorded write operations. The techniques described herein may be used with monitoring the size of the storage allocated for storing the snapshot data and dynamically adjusting the size as needed. As described in more detail below, such monitoring and adjustments may depend on the size of the storage area for which protection is being provided. For example, if data protection is provided using snapshots for user data stored in a user data area (e.g., one or more devices), the techniques herein may be used to monitor the size of the user data area being protected and make any necessary adjustments to the amount of storage allocated for storing the snapshot data. The storage allocated for storing the snapshot or other data produced using a data protection technique may be referred to as a data protection area or data protection storage area. In connection with techniques herein, the size of the data area for which protection is being provided includes both used or consumed storage and free storage. The used or consumed storage has data stored thereon, such as user data. The free storage may refer to available or unused storage of the data area. In connection with techniques herein, the total amount of storage allocated including both used and free space, may be considered when determining the size of the data protection storage area.

Additionally, in the embodiment described herein in connection with snapshots as the data protection method, a base or original set of the user data is needed in combination with one or more log files of recorded changes made with respect to the original data set. For example, there may be an original set of data at an initial or starting point in time. Changes made with respect to the original data set are recorded in a log file in an embodiment using a copy on write technique for snapshots. At a first point in time after a first set of changes have been made to the original data set, a first snapshot may be taken where the changes recorded up to the first point in time may be stored in a log file. When the first snapshot is obtained, the changes recorded up to the first point in time may be stored in a first file in the data protection area. Additional changes subsequent to the first point up to a second point in time may be made and recorded. At the second point in time, a second snapshot may be taken where the changes recorded between the first and second points in time are also stored in a log file. When the second snapshot is obtained, additional changes recorded between the first and second points in time may be stored in a second file in the data protection area. Thus, the changes recorded at both the first and second points in time may be stored in the data protection area described herein. Additionally, with snapshots, the original set of data is also needed to recover the data at either the first or second point in time. The embodiment may also have a copy of the original data set on another device in addition to the storage allocated for the data protection area described herein. It should be noted that an embodiment using a different snapshot technique may similarly obtain and store other data as a result of obtaining a snapshot and store such data in the data protection storage area.

Additionally, for snapshots or other data protection processes, a data protection schedule and retention policy may be specified. With the data protection schedule, different parameters may be specified including the frequency or how often the selected data protection process is performed. For example, a data protection schedule may specify that a snapshot is taken of data on one or more devices daily, every few hours, and the like. With the retention policy, different parameters may be specified including how long to retain a data snapshot or other form of data obtained using a data protection process. For example, the retention policy may specify that data obtained in connection with snapshots are retained for 1 week, 10 days, 30 days, and the like. Thus, each of the log files or other information obtained at different points in time by the data protection process may be retained for an amount of time in accordance with the retention policy. Aspects of the data protection schedule and/or retention policy may vary with system requirements, state and/or federal compliance, and the like.

The techniques herein provide for proactively and automatically monitoring various aspects of the data storage system including retention policies, data protection (DP) schedules, size of the data area being protected, rate of change with respect to the data area being protected, and size of the DP storage area to dynamically assess, and make necessary adjustments to, the DP storage area size. It should be noted that the data area being protected may also be referred to herein as a user data area although, for purposes of the techniques herein, the data area being protected is not limited for use with data that may be characterized as user data. In other words, although the data area being protected may be referred to herein as "user data area", the techniques herein may, more generally, be used in connection with any data area storing any type of data. References to the protected data area with respect to the term "user data" should not be construed as a limitation of the techniques herein to any particular type of data. Techniques herein provide for determining DP storage area requirements based on the size of the user data area, or more generally, the data area being protected, the retention time, and the rate of change. The foregoing monitoring and adjusting may be made in accordance with relationships expressed in the following equation:

$$\text{(User data space size} * \text{\%change rate)} * RT \qquad \text{EQUATION 1}$$

where user data space size is the size of the data area being protected;

% change rate is the rate of change of data in the user data space or data area protected; and RT is the retention time as may be specified in the RT schedule indicating the amount of time information obtained by the data protection process must be retained.

It should be noted that % change rate and RT are in the same unit of measurement (e.g., so that % change rate may represent a daily change rate and RT may be expressed in a number of days).

The RT is an amount of time measured with respect to the time at which each instance of data or information is obtained by the data protection process in accordance with a DP schedule frequency. For example, if a snapshot is obtained at a frequency of every day, and the RT=10 days, each snapshot is retained for 10 days measured from when each snapshot is taken. Thus, RT is a factor which affects an amount of DP storage required at a point in time.

The % change rate may be determined in a variety of different ways that may vary in an embodiment. For example, an initial % change rate may be selected as a starting or seed value. The initial % change rate may be selected based on historical observed information of the data being protected, general know how for a particular DP process, and the like. The % change rate may be recalculated periodically such as at predetermined time intervals based on actual or observed characteristics with respect to the user data area being protected. For example, an embodiment may recalculate the % rate of change on a daily or weekly basis. The number or amount of change with respect to the user data area may be measured and/or estimated in a variety of different ways. For example, an embodiment may record or estimate a number of changes based on recorded write operations, size of log files of recorded write operations, and the like, with respect to a time period to determine a % change rate. To further illustrate, an embodiment may recalculate % change rate on a weekly basis and may count a number of bytes of the user data area which are modified during the week. The % change rate may be determined based on a ratio of "#bytes modified" with respect to the "size (in bytes) of the user data area being protected". For example, the user data area size may be 100 GB and 5 GB of storage may be modified or otherwise written to during the week. It should be noted that the 5 GB of modifications may include writing to free or unused portions of the user data area (e.g., creating and writing data to a new file) as well as rewriting new data to portions of the user data area already including user data (e.g., updating data of an existing file).

The % change rate may also be based on historical information obtained over longer or other periods of time. For example, there may be particular known or historical usage patterns with respect to a rate of change of one or more devices as may be used by one or more applications, groups, and the like, at particular times of the month, week, year, etc. To further illustrate, each year with an accounting firm, there may be an expected % rate of change during particular times of the year based on when corporate and/or personal taxes are due. As such, the % rate of change for a current year may be based on information obtained for one or more prior years. Thus, this % rate of change may be used in a current year based on observed expected changes obtained from a previous year at tax time. The % rate of change may be subsequently adjusted or lowered in accordance with historical information related to expected usage after the corporate and/or personal tax due dates.

Using EQUATION 1, an embodiment may make an initial determination regarding the DP storage area size. The initial determination may be made, for example, when the user may be initially provisioning storage for the user data area. Based on EQUATION 1, there is a direct relationship between the size of the user data area, % change rate and retention time and the storage requirements for the DP storage area. At subsequent points in time, as any one or more of the size of the user data area, % change rate, and retention time increases, so does the DP storage area requirements as determined by EQUATION 1. As an example using EQUATION 1, consider a user data area size of 100 GB, a % change rate on a daily basis of 5%, and a retention time of 10 days. Applying EQUATION 1, the DP storage area size should be 50 GB (e.g., (100 GB*5%)*10 days=50 GB). As such, an initial DP storage area size may be determined using EQUATION 1 of 50 GB. At subsequent points in time, the data storage system may be monitored for changes to any one or more of the size of the user data area, % change rate, and retention time. If any one or more of these changes, code of the data storage system may be executed to recalculate the DP storage area requirements as determined by EQUATION 1 and make an assessment as to whether to adjust the size of the DP storage area. The foregoing process of monitoring and reassessing may be performed in an ongoing basis for automatic monitoring and dynamically adjusting the amount of storage allocated for (e.g., size of) the DP storage area.

It should be noted that in EQUATION 1, the same units of time are used in EQUATION 1 with respect to the % change rate and RT. For example, the RT and % change rate may be expressed in terms of days although other units of time may be used. For example, RT may be 10 hours and the % change rate may indicate a rate of change on an hourly basis. Additionally, the rate of change is expressed in EQUATION 1 as a percentage and may take other equivalent forms. The % change rate may also vary with the particular DP process used.

It should also be noted that the above-noted EQUATION 1 may be expressed in another form as:

$$\frac{(\text{User data space size} * \% \text{ change rate})}{\text{Frequency}} * RT * \text{Frequency} \qquad \text{EQUATION 2}$$

where, in addition to the terms described above in EQUATION 1, EQUATION 2 also contains Frequency representing the frequency or rate at which the DP process is performed (e.g., how often a snapshot is taken such as hourly, daily, weekly, and the like). EQUATION 2 simplifies to EQUATION 1 in that the two Frequency terms in the above EQUATION 2 cancel out mathematically.

It should be noted that the % change rate in the foregoing EQUATION 1 and EQUATION 2 may account for multiple re-writes of the same data during a single period of time in a variety of different ways depending on how % change rate is determined and/or how the DP process stores or records changes. The single period of time may refer to a period of time based on, or equal to, the time unit used to express the % change rate (e.g., per day or daily). For example, a DP process may record each write transaction as a single entry in the log file. In this case, a first write to data at address 1 results in a first log entry. Some time later in the same period, a second write to data at the same address 1 results in a second different log entry. The DP process may store a snapshot including the foregoing 2 write log entries. If the technique used to determine the % change rate determines a number of changes based on the logged write entries, the foregoing 2 modifications to the same data location may be counted as 2 changes.

In a different embodiment, the DP process may further process recorded write logs described above prior to storing snapshot data in the DP area. In this case, the processing may collapse the multiple write log entries to a same data location into a single entry based on the latest/last value written to the data location. In this latter embodiment, the DP process may store a snapshot including a single entry representing the net result of applying the multiple write entries to the same data location. If the technique used to estimate the % change rate determines a number of changes based on the logged write entries, the foregoing 2 modifications to the same data location which are collapsed into a single entry may be counted as a single change.

Whether there is only a single snapshot taken within a period of time (e.g., used as the unit for % change rate) or whether there are multiple snapshots taken within such a period of time, how the rewriting of a same data area is accounted for with respect to the % change rate may be dependent on the DP process and how an embodiment calculates, estimates, or otherwise determines the % change rate. In an embodiment, the mathematical product of "user data space size*% change rate" (where % change rate is expressed as rate of change on a daily basis) may be equivalent to the total amount of space consumed per day by the write log.

Figure 2:
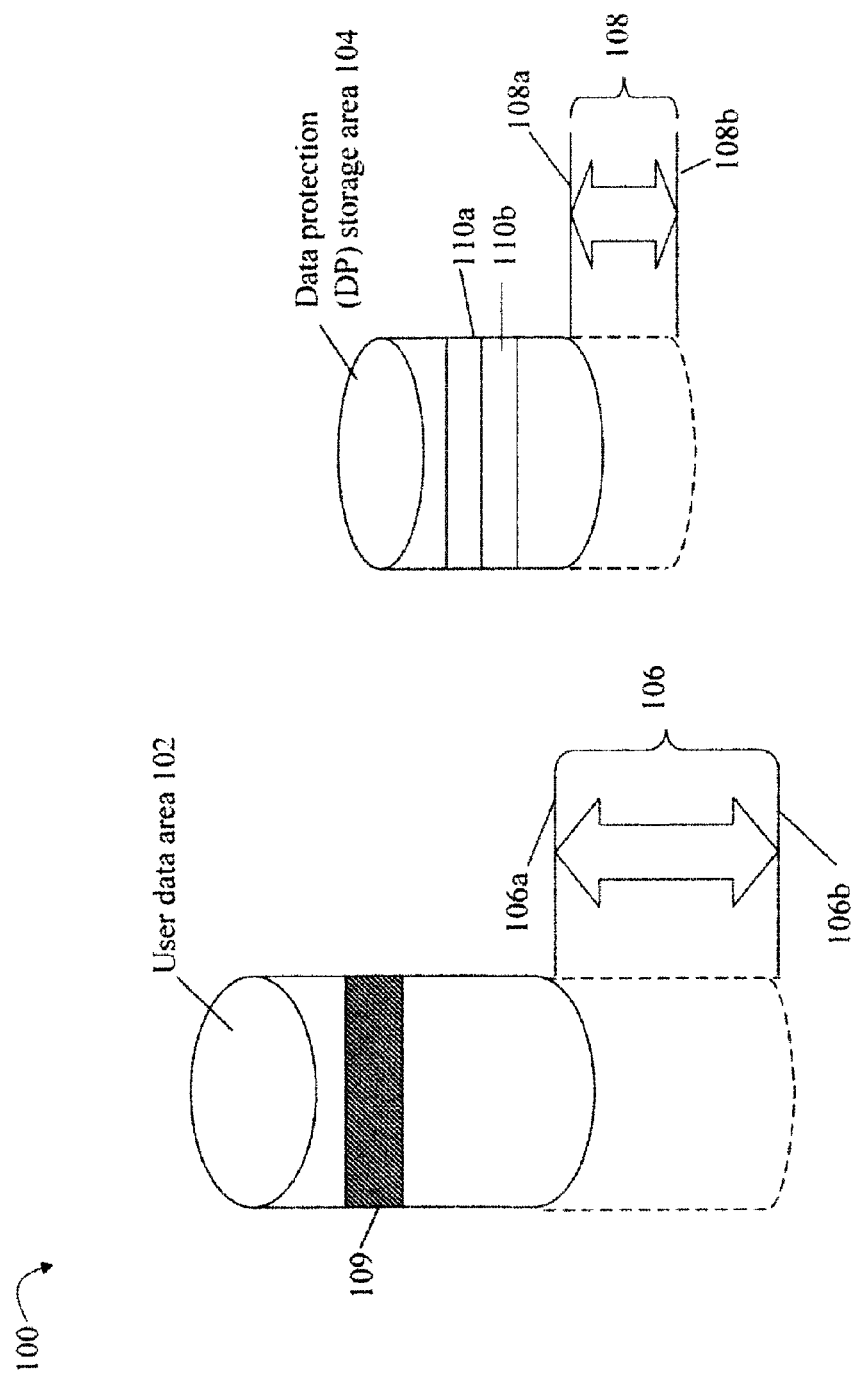
FIG. 2 is an example illustrating how techniques herein may be utilized in connection with determining storage requirements for a data protection (DP) storage area.

Referring to FIG. 2, shown is an example illustrating various aspects or factors of EQUATION 1 which may be used to determine an amount of storage to allocate for the DP storage in an embodiment in accordance with techniques herein. The example 100 includes user data area 102 and DP storage area 104. The user data area 102 may represent the data area having data protection provided using snapshots. Element 109 represents a portion of 102 which has changed or been modified within a time period, such as on a daily basis. Element 106 may represent the amount by which the user data area may be increased. For example, user data area 102 may have an initial storage allocation as represented by 106a. At a later point time, the user data area may be increased to 106b. Elements 110a and 110b may represent data obtained and recorded by the DP process, such as for snapshots, which is stored in the DP storage area 104. Each of 110a and 110b may represent a single instance of snapshot data recorded in accordance with a defined DP schedule frequency. The number of instances of snapshot data at different points in time is affected by the RT. For example, the RT may be 2 days and a snapshot may be obtained daily. The system may be monitored so that when the user allocates additional storage to the user data area 102, such as increasing the size from 106a to 106b, the foregoing change in size to 102 is detected and may trigger a recalculation or reassessment of the DP storage area size using EQUATION 1. In response, the data storage system may automatically increase the size of the DP storage area from 108a to 108b. In a similar manner, the data storage system may be monitored to detect changes to the RT and % change rate or rate of change of data included in 102. The occurrence of a change or modification to the RT, size of 102, or % change rate may be characterized as an occurrence of a trigger event. In response to an occurrence of a trigger event, the data storage system may automatically reassess whether a modification to the DP storage area size is needed, and if so, may also determine an adjustment amount. The adjustment may represent an amount by which the DP storage area size is increased or decreased. It should be noted that an embodiment in accordance with techniques herein may only increase the size of the DP storage area in accordance with EQUATION 1. An embodiment in accordance with techniques herein may also provide for increasing or decreasing the size of the DP storage area in accordance with EQUATION 1.

An embodiment in accordance with techniques herein may perform the recalculation or reassessment with respect to the DP storage area size in accordance with EQUATION 1 in response to the occurrence of any one of the trigger events noted above. An embodiment may also perform the reassessment or recalculation using EQUATION 1 at predetermined time intervals. An embodiment may also perform the recalculation of the % change rate at predetermined time intervals. For example, at predetermined time intervals, code of the data storage system may be executed to recalculate the % change rate. If the % change rate at the current point in time has changed since the previous time interval, a reassessment and recalculation in accordance with EQUATION 1 may be performed. It should be noted that reassessment and recalculation using EQUATION 1 may be performed in response to any change to the % change rate, or any difference in the % change rate, which may be characterized as sufficiently significant. For example, if the % change rate increases from 4.56% to 4.57%, an embodiment may choose not to perform the reassessment since the difference in % change rates at successive time intervals is not significant or greater than a threshold amount. Additionally, the embodiment may also examine additional historical information regarding the % change rate at previous time interval occurrences. For example, the % change rate over the last 10 intervals may be recorded. Even though the difference in % change rate for two successive intervals is not deemed sufficiently significant, the difference between % change rate at the current time and one or more previous time intervals may also be examined. For example, over the last 10 intervals the % change rate may have increased 0.01% each interval for a collective increase of 0.1% which may be sufficiently significant to trigger a reassessment and recalculation of the DP storage area size in accordance with EQUATION 1. Similarly, in an embodiment which also provides for decreasing the size of the DP storage area, differences in the % change rate which are decreases may also be monitored between two successive intervals, collectively across multiple successive intervals, and the like.

An embodiment may have a separate DP storage area 104 for each storage resource such as each storage device or volume. In this case, each storage resource being protected may have its own dedicated or exclusive DP storage area as determined using EQUATION 1. As a variation, an embodiment may also have a combined or collective amount of DP storage areas (also referred to as a DP storage area pool) which includes DP storage areas for multiple storage resources, such as multiple devices. In this case, each device may contribute a portion to the DP storage area pool in accordance with EQUATION 1 and storage for DP for any of the contributing devices may be used from anywhere in the DP storage area pool. In other words, each device does not have an exclusive DP storage area.

An embodiment may also allow multiple schedules for a same resource. For example, two different DP schedules may exist at the same time for a resource such as user data area 102. In this case, an embodiment may used EQUATION 1 to determine a first size of DP storage area for the first schedule and a second size of the DP storage area for the second schedule. The amount of storage allocated may be based on the sum of the foregoing first and second sizes.

An embodiment may use EQUATION 1 to make an initial determination of the DP storage area size. Subsequently, the embodiment may include an option to turn off the automatic monitoring and/or dynamic adjustment of the DP storage area size. As a variation, an embodiment may provide for performing the initial determination and performing the ongoing monitoring and making a determination about whether to make an adjustment to the size of 104, and if so what is the adjustment amount. However, the embodiment may not automatically make the adjustment but may rather provide a means for user notification and require user confirmation prior to actually modifying the size of 104. The means for user notification may be any one or more of a variety of notification means such as, for example, email notification, console or alert notification messages which may be displayed when a user is logged on, and the like. The user may therefore be provided with an opportunity to override making the automatically determined adjustment or manually modify the amount of the adjustment determined in accordance with EQUATION 1.

An embodiment may also selectively enable/disable one or more trigger events. For example, as described elsewhere herein, an embodiment may provide for automatic monitoring, recalculation and adjustment of the size of 104 based on EQUATION 1 when there is a modification or change (or a significant change) to any one or more of the RT, size of 102, or % change rate. An embodiment may provide for enabling/disabling the automatic monitoring, recalculation and adjustment for one or more of the foregoing trigger events. For example, the automatic monitoring, recalculation and adjustment my be performed if there is a modification to the size of 102 but not in response to a change in RT or % change rate. An embodiment may also provide an option for specifying one or more thresholds used for determining whether a change to the size of 102, a change in RT, and/or a modification in the % change rate is significant.

An embodiment may provide for using different techniques in connection with determining a % change rate. An embodiment may allow for selection or specification via user interface or selection, configuration file, and the like, of one or more options used for determining a % change rate. For example, options may include selecting one of a variety of different historical data sources, selecting a time interval or frequency at which the % change rate is determined, using a predetermined or fixed value, user a user-specified value for the % change rate, and the like.

An embodiment may perform a recalculation of the DP storage area requirements using EQUATION 1 in response to a change in one or more of the parameters or variables of EQUATION 1 as described above. It should also be noted that an embodiment may choose not to perform the recalculation if the change(s) to one or more of the parameters is/are not significant as may be determined using one or more thresholds. For example, there may be a change to the size of the user data area and/or % change rate. If the change to the size of the user data area is not be larger than a minimum amount or first threshold, the change may be deemed insignificant. If the change to the % change rate is not larger than a minimum amount, the change to % change rate may also be deemed insignificant. An embodiment may make a determination as to whether the change in one or more parameters of EQUATION 1 is significant based on a collective view of all changes to all parameters, based on an evaluation of each individual parameter, and/or other criteria as may be included in an embodiment such as based on an amount of time that has lapsed since a last change in one or more of the parameters. If the change to the one or more parameters is deemed insignificant, then the embodiment may not recalculate the DP storage area requirements using EQUATION 1. As such, a trigger event may be defined in an embodiment to include any change to one or more of the parameters, and/or any significant change to one or more parameters as may be determined using minimum or threshold value(s) as described above. An embodiment may also deem that any change to one or more of the parameters is also a significant change and such a determination may vary with embodiment.

Figure 3:
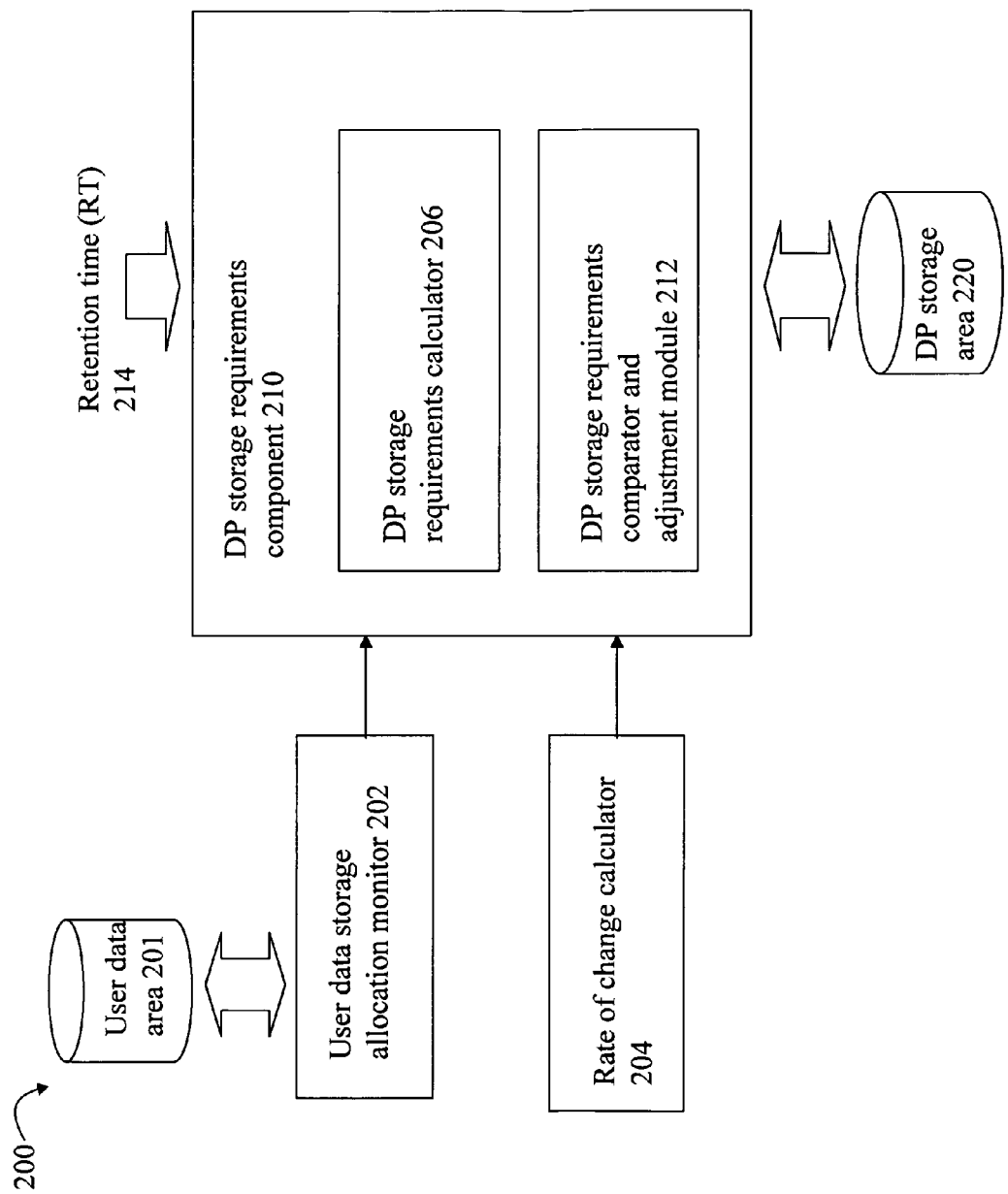
FIG. 3 is an example of components that may be included in an embodiment in connection with performing the techniques described herein.

Referring to FIG. 3, shown is an example of components that may be included in an embodiment in accordance with techniques herein. The components of FIG. 3 may be included on a data storage system, such as a data storage array or appliance, in accordance with techniques herein. The example 200 includes a user data area 201 and DP storage area 220 which are similar to, respectively, 102 and 104 of FIG. 2. The example 200 includes a user data storage allocation monitor 202, rate of change calculator 204, and DP storage requirements component 210. The component 210 may include a DP storage requirements calculator 206 and a DP storage requirements comparator and adjustment module 212. The user data storage allocation monitor 202 may monitor the size of the user data area 201 and provide the size to the component 210. The rate of change calculator 204 may determine the % change rate (as denoted in EQUATION 1) or rate of change with respect to the user data area 201. The calculator 204 may provide the % change rate to the component 210. The component 210 may receive as an input the RT 214 such as may be specified in a retention policy. The component 210 may also be notified when there a change Co 214 by providing the modified or latest RT 214 to the component 210. The component 210 may determine whether to perform an assessment or calculation of the size of the DP storage area 220 in accordance with EQUATION 1. If such calculation is needed, the DP storage requirements calculator 206 may perform the calculation to determine a calculated size of the DP storage area using EQUATION 1. The DP storage requirements comparator and adjustment module 212 may compare the calculated size as determined by 206 and compare it to the current size of the DP storage area 220 to determine whether an adjustment to the size of 220 is needed. If so, the module 212 may also determine an amount or size of the adjustment to 220.

It should be noted that the example 200 illustrates one way in which the processing described herein may be partitioned among components in an embodiment in accordance with techniques herein. It will be appreciated by those skilled in the art that the processing may be partitioned in other ways and embodied in different components than as illustrated in FIG. 3. Each of the components of FIG. 3 may be implemented using hardware and/or software in an embodiment.

What will now be described are flowcharts in FIGS. 4-9 which summarize processing described above for automatically monitoring, assessing and recalculating a size of the DP storage area in an embodiment in accordance with techniques herein.

Figure 4:
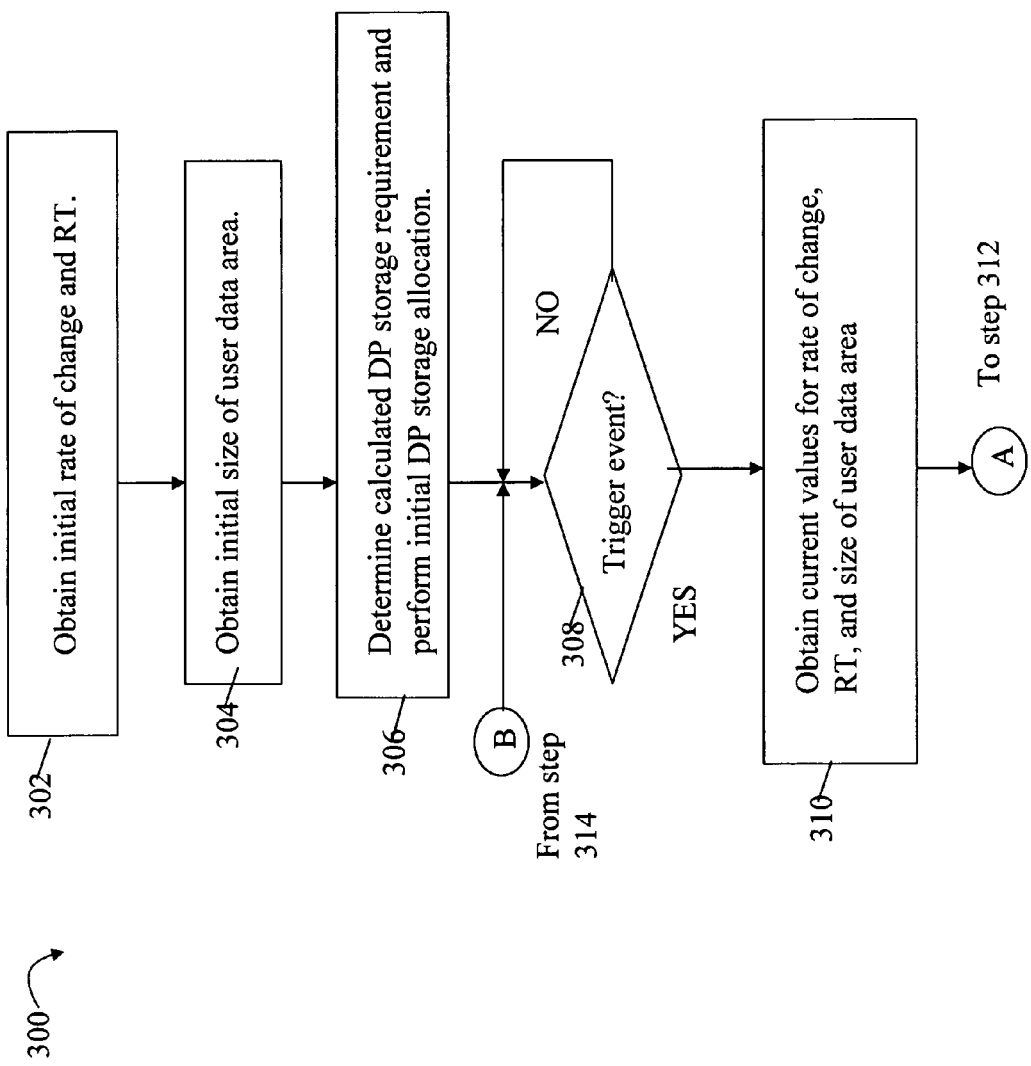
FIGS. 4-9 are flowcharts of processing steps that may be performed in an embodiment in accordance with techniques herein.
Figure 5:
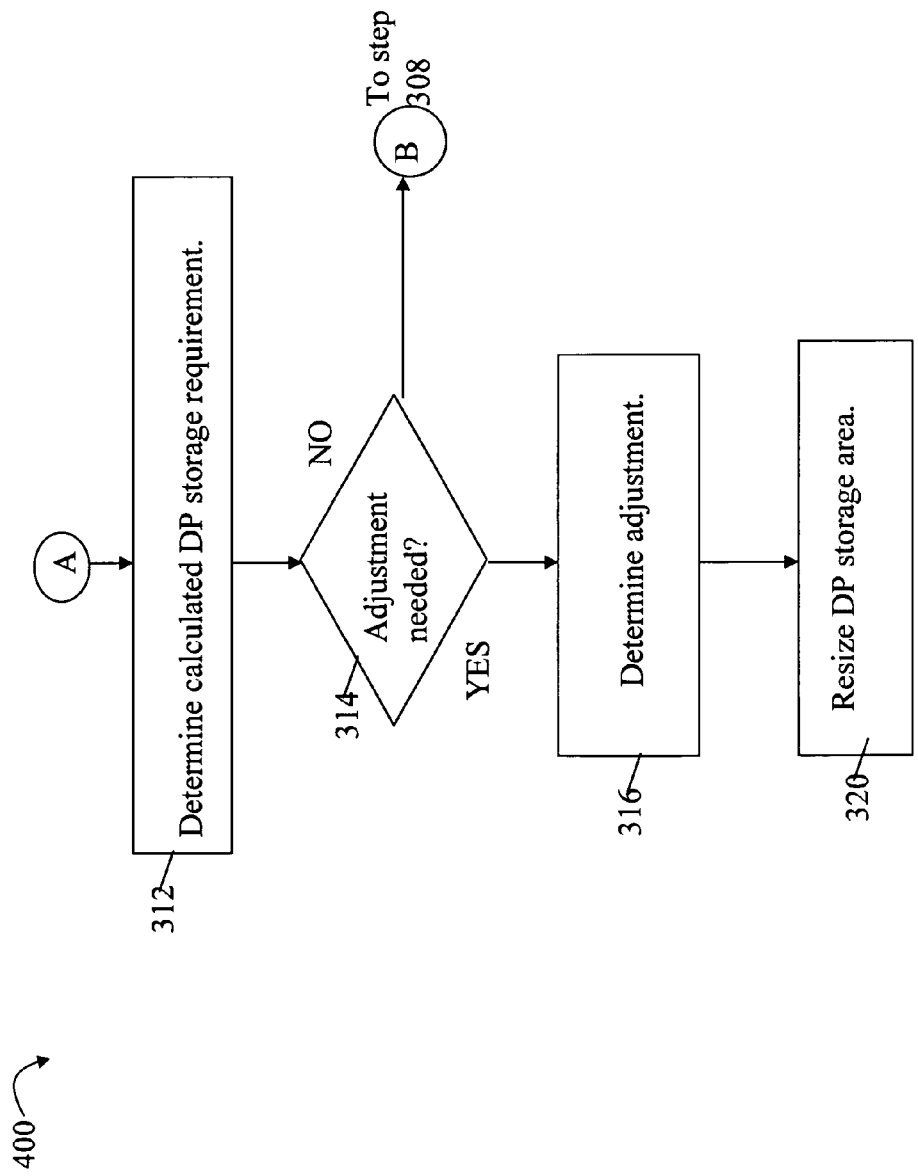

Referring to FIGS. 4 and 5, shown are flowcharts 300 and 400 of processing steps that may be performed in an embodiment in accordance with techniques herein. At step 302, an initial rate of change (e.g., % change rate) and RT are obtained. At step 304, an initial size of the user data area or, more generally, data area being protected, is obtained. Elements 302 and 304 may be obtained, for example, when a user is initially provisioning storage for the user data area. At step 306, an initial value for the DP storage area size is determined using EQUATION 1 and such storage is initially allocated for DP protection storage. At this point, processing waits at step 308 until an occurrence of a trigger event which may be, for example, a change (or a sufficiently significant change) with respect to RT, size of the user data area, and/or rate of change (% change rate). When step 308 evaluates to yes, control proceeds to step 310 to obtain the current values to use for the rate of change, RT and size of the user data area. At step 312, a calculated DP storage requirement is determined using EQUATION 1. At step 314, a determination is made as to whether an adjustment is needed. Step 314 may be determined, for example, by comparing the calculated value of step 312 to the current size of the DP storage area. If the difference between the calculated value of step 312 and the current size of the DP storage area is not zero, or the difference is otherwise a sufficiently large enough positive or negative value, an adjustment (increase or decrease) to the size of the DP storage area may be needed. Whether the difference is sufficiently significant may be determined with respect to one or more specified threshold values. Also, as described elsewhere herein, an embodiment may increase or decrease the size of the DP storage area. An embodiment may alternatively only increase the size of the DP storage area. Step 314 is described in more detail in following paragraphs.

If step 314 evaluates to no indicating that no adjustment is needed, control proceeds to step 308. Otherwise, if step 314 evaluates to yes, control proceeds to step 316 to determine an amount for the adjustment. At step 320, the DP storage area is resized in accordance with the adjustment determined at step 316.

Figure 6:
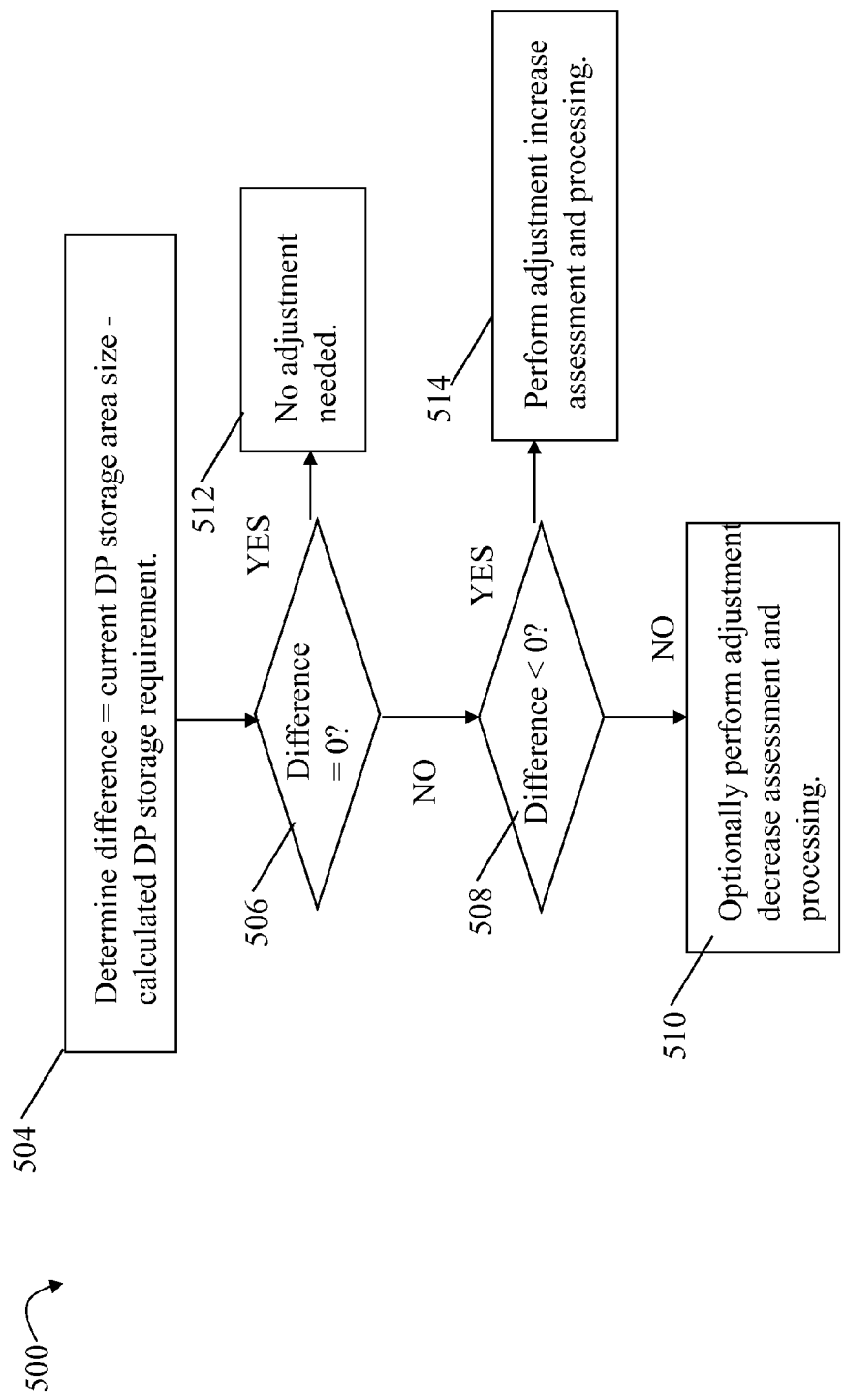

Referring to FIG. 6, shown is a flowchart illustrating additional detail regarding steps that may be performed in an embodiment in accordance with techniques herein in connection with determining whether an adjustment to the size of the DP storage area is needed, and if so, an amount for the adjustment. At step 504, a difference may be determined as result of current DP storage area size—calculated DP storage requirement (as determined in step 312). At step 506, a determination is made as to whether the difference is 0. If so, control proceeds to step 512 and no adjustment is needed. Otherwise control proceeds to step 508. At step 508, a determination is made as to whether the difference is less than zero.

If so, control proceeds to step 514 to perform adjustment increase assessment and processing. Otherwise, if step 508 evaluates to no (meaning that the difference is greater than 0), control proceeds to step 510 to optionally perform adjustment decrease assessment and processing. As described above, an embodiment may only increase the size of the DP storage area and if so, step 510 is not performed.

Figure 7:
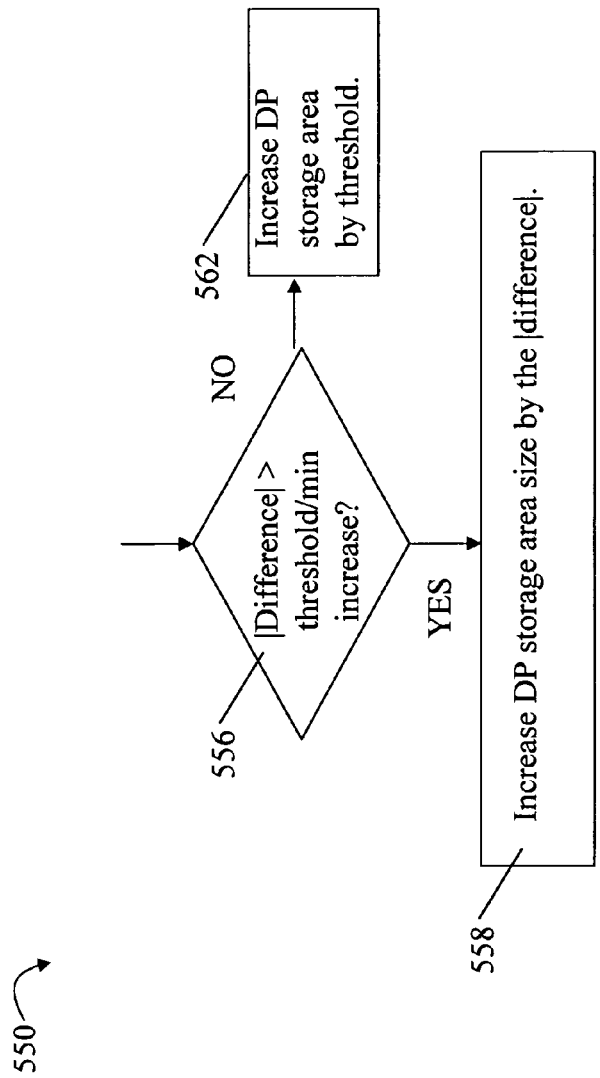
Figure 8:
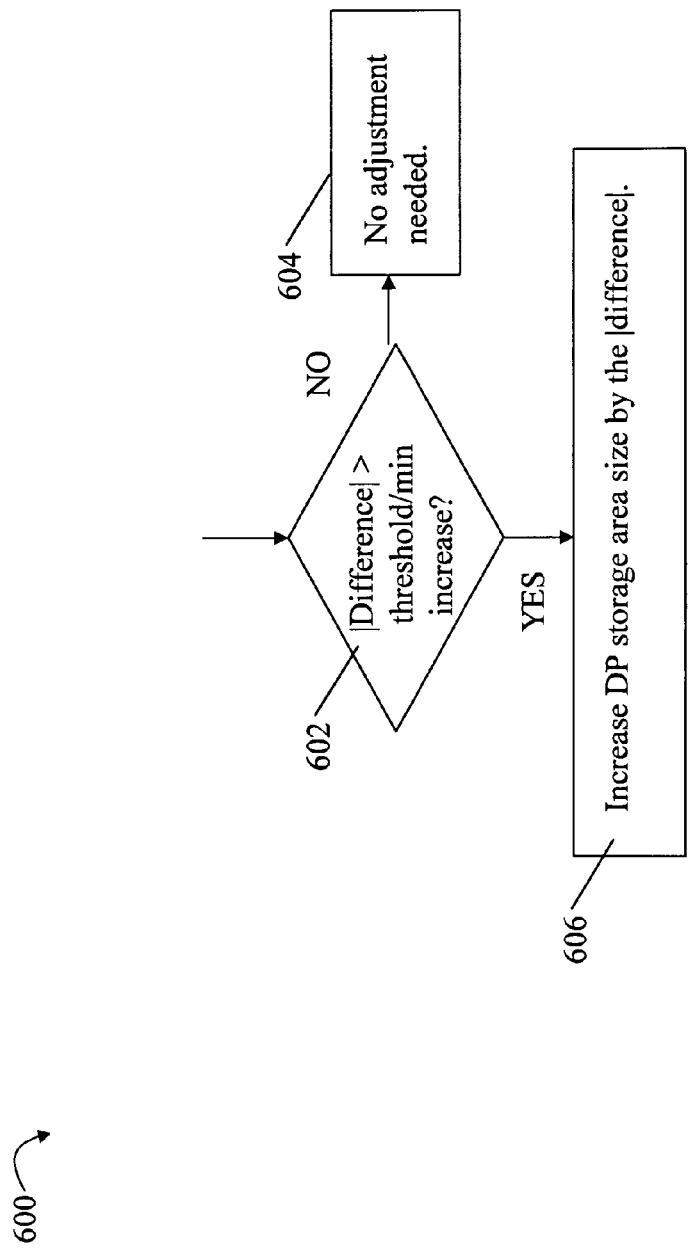

What will now be described in connection with FIGS. 7 and 8 are flowcharts of processing steps that may be performed as part of step 514 processing for adjustment increases.

Referring to FIG. 7, shown is a flowchart of processing steps that may be performed in a first embodiment of step 514 in accordance with techniques herein. The flowchart 550 provides additional detail for one implementation of step 514. At step 556, a determination is made as to whether the absolute value of the difference, denoted "|difference|", is larger than a threshold or minimum value. If step 556 evaluates to no, control proceeds to step 562 to increase the DP storage area by a minimum amount such as may be indicated by the threshold used at step 556. Step 562 may provide for increasing the size of the DP storage area by a minimum amount. If step 556 evaluates to yes, control proceeds to step 558 to increase the DP storage area by an amount represented by |difference|. It should be noted that when performing any resizing (increase and/or decrease) with respect to the size of the DP storage area, it will be appreciated that such allocations may be made in accordance with any boundary or other restrictions/requirements as may vary with each embodiment.

Referring to FIG. 8, shown is a flowchart of processing steps that may be performed in a second embodiment of step 514 in accordance with techniques herein. The flowchart 600 provides additional detail for another implementation of step 514. Steps 602 and 606 are, respectively similar to steps 556 and 558 of FIG. 7. FIGS. 7 and 8 differ with respect to steps 562 and 604 processing. At step 602, a determination is made as to whether the absolute value of the difference, denoted "|difference|", is larger than a threshold or minimum value. If step 602 evaluates to no, control proceeds to step 604 where no adjustment is made to the size of the DP storage area. Step 604 provides for making no adjustment to the DP storage area size unless the difference between the calculated and current DP storage area sizes is more than a threshold or minimum amount.

Figure 9:
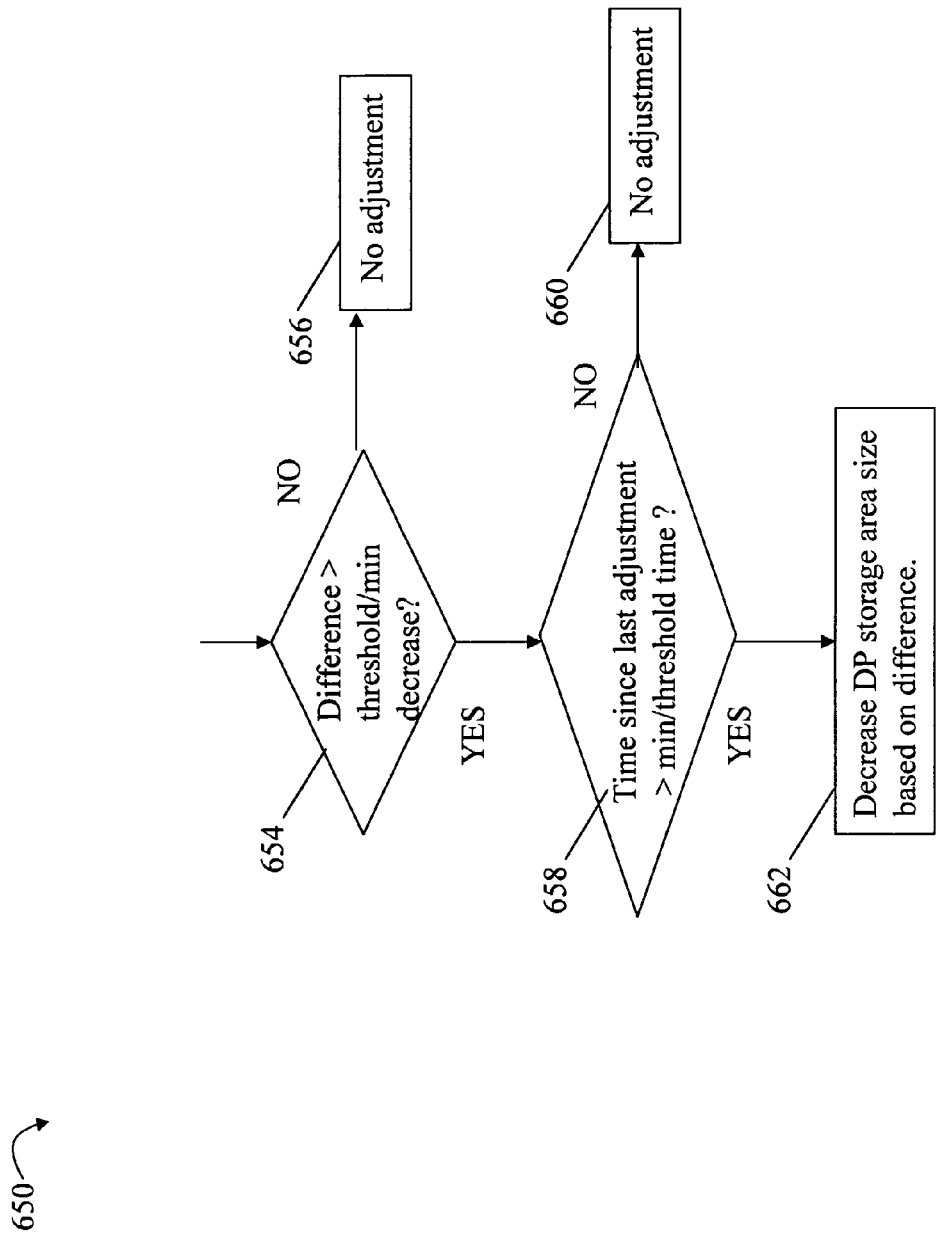

Referring to FIG. 9, shown is a flowchart of processing steps that may be performed in an embodiment of step 510 in accordance with techniques herein. The flowchart 650 provides additional detail for one implementation of step 510. At step 654, a determination is made as to whether the difference is larger than a threshold or minimum value. If step 656 evaluates to no, control proceeds to step 656 where there is no adjustment made to the size of the DP storage area. If step 654 evaluates to yes, control proceeds to step 658 where a determination is made as to whether the amount of time since the last adjustment to the size of the DP storage area is above a minimum amount of time. If not, control proceeds to step 660 where no adjustment is made to the size of the DP storage area. Otherwise, if step 658 evaluates to yes control proceed to step 662 where the DP storage area size is decreased an amount based on the difference (e.g., size may be reduced by the difference).

The flowchart 650 provides for decreasing the size of the DP storage area if the difference is more than a threshold amount and there has been a minimum amount of time since the last adjustment, either an increase or decrease. These two conditions may be used to avoid making unnecessary decreases in size, for example, because the amount of storage recovered by the decrease is too small (e.g., step 654) or because too little time has elapsed since the last adjustment (e.g., step 658).

It should be noted that the processing of the foregoing flowcharts provides examples of processing steps and an exemplary ordering of such steps as may be performed in an embodiment in accordance with techniques herein. An embodiment may also perform variations and other differences than those just described in accordance with the techniques herein. For example, with reference to FIG. 6, rather than determine a difference between the calculated DP storage requirements and current DP storage area size and use this difference in the processing steps, an embodiment may perform a comparison between the two sizes to determined whether to perform step 512, 514 or 510.

As described above, techniques herein provide for automatically monitoring and adjusting the size of the DP storage area as the calculated DP storage requirements, such as in accordance with EQUATION 1, approaches or exceeds the actual size of the DP storage area. The techniques herein may also be used to optionally decrease the size of the DP storage area as well as increase the size of the DP storage area to provide for more efficient use of data storage. The DP storage requirements as calculated using EQUATION 1 may be based on the current size of the storage area being protected, the RT for retaining copies of data obtained using a selected data protection process (such as snapshots), and a rate of change. The rate of change may be the rate at which data within the data set being protected changes such as by new data written to free or unused storage and rewriting or updating existing data currently stored. A default rate of change (denoted % change rate in EQUATION 1) may be provided such as for an initial value. An exemplary initial value for % change rate may be a 5% daily modification rate. The techniques herein provide for customized and dynamic determination of the size requirements for the DP storage area in a proactive manner for efficient storage utilization and to avoid possible data loss as may occur if storage allocated in the DP storage area is exhausted.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method of determining storage requirements for data protection, the method comprising:

receiving a first size of a first data area for which data protection is performed, wherein data obtained as a result of performing a data protection process for the first data area is stored in a data protection area;

receiving a retention time representing an amount of time data obtained as a result of performing the data protection process is retained;

receiving a rate of change representing a rate at which data in the first data area changes;

determining a first value based on said first size, said retention time, and said rate of change, said first value representing a calculated size of the data protection area;

allocating storage for the data protection area having a size of said first value;

adjusting the size of the data protection area in response to an occurrence of a trigger event, wherein the first value indicating the size of the data protection area represents a total amount of storage in the data protection area thereby including both currently consumed storage of the data protection area and available storage of the data protection area; and wherein, in response to said occurrence of the trigger event, first processing is performed including:
repeating said determining step and obtaining an updated version of said first value based on current values for said first size, said retention time and said rate of change;
determining whether the updated version of the first value is less than said first value; an
if the updated version of the first value is significantly more than the first value, increasing the size of the data protection area to be more than the first value.

2. The method of claim 1, wherein said first value is determined as a product of the retention time, the rate of change and the first size.

3. The method of claim 1, wherein the rate of change is represented as a percentage value.

4. The method of claim 1, wherein said retention time is a parameter of a retention policy.

5. The method of claim 1, wherein said trigger event is one or more of: a change to the retention time, a change to the rate of change, and a change to the first size.

6. The method of claim 5, further comprising:
determining whether there has been a significant change to one or more of: the retention time, the rate of change, and the first size, said significant change being determined in accordance with one or more thresholds.

7. The method of claim 5, further comprising:
if the updated version of the first value is significantly less than the first value and the size of the data protection area has not been increased or decreased within a threshold amount of time, decreasing the size of the data protection area in accordance with a difference between said first value and said updated version of the first value.

8. The method of claim 1, wherein said rate of change is based on previously observed data changes made with respect to the first data area.

9. The method of claim 1, wherein said rate of change is based on a default value.

10. The method of claim 1, wherein said rate of change is obtained at a first point in time and the method further comprising:
recalculating said rate of change at a second point in time based on an amount of data changes to the first data area since said first point in time.

11. The method of claim 2, wherein said data protection process obtains a snapshot of the first data area at different points in time in accordance with a data protection schedule.

12. The method of claim 1, wherein the updated version of the first value is determined to be significantly more than the first value when the updated version of the first value exceeds the first value by a threshold amount, and the method includes:
if the updated version of the first value is significantly more than the first value, increasing the size of the data protection area from the first value in accordance with an absolute value of a difference between the first value and the updated version of the first value, and otherwise, if the updated version of the first value is more than the first value and the updated version of the first value does not exceed the first value by the threshold amount, the size of the data protection area is increased by the threshold amount.

13. A computer-implemented method of determining storage requirements for data protection, the method comprising:
determining an initial size of a data protection area having storage used for storing data obtained as a result of performing a data protection process for a first data area, said initial size being determined as a mathematical product of a first size representing a size of the first data area for which data protection is performed, a retention time representing an amount of time data obtained as a result of performing the data protection process is retained, and a rate of change representing a rate at which data in the first data area changes;
allocating storage for the data protection area having a size of said initial size;
monitoring for an occurrence of one of a plurality of trigger events; and
in response to an occurrence of one of the plurality of trigger events, determining whether an adjustment to a current size of the data protection area is needed, wherein the current size of the data protection area represents a total amount of storage in the data protection area thereby including both currently consumed storage of the data protection area and available storage of the data protection area; and
wherein said determining whether an adjustment to the current size of the data protection area is needed further including:
recalculating a second size for the data protection area using current values for size of the first data area, the rate of change, and the retention time;
determining whether the second size is less than said current size; and
if the second size is significantly more than the current size, increasing the size of the data protection area to be more than the current size.

14. The method of claim 13, further comprising:
determining an amount of the adjustment if it is determined that an adjustment to the current size is needed.

15. The method of claim 13, wherein said plurality of trigger events include a change to one or more of the retention time, the rate of change, and the first size.

16. The method of claim 13, wherein determining whether an adjustment is needed is performed using one or more threshold values and said determining whether the second size is less than the current size includes
comparing the second size of the data protection area determined by said recalculating to the current size of the data protection area.

17. A non-transitory computer readable storage medium comprising code stored thereon for determining storage requirements for data protection, the computer readable medium comprising code stored thereon that:
  determines an initial size of a data protection area having storage used for storing data obtained as a result of performing a data protection process for a first data area, said initial size being determined as a mathematical product of a first size representing a size of the first data area for which data protection is performed, a retention time representing an amount of time data obtained as a result of performing the data protection process is retained, and a rate of change representing a rate at which data in the first data area changes;
  allocates storage for the data protection area having a size of said initial size;
  monitors for an occurrence of one of a plurality of trigger events; and
  in response to an occurrence of one of the plurality of trigger events, determines whether an adjustment to a current size of the data protection area is needed, wherein the current size of the data protection area represents a total amount of storage in the data protection area thereby including both currently consumed storage data of the data protection area and available storage of the data protection area; and
  wherein said determining whether an adjustment to the current size of the data protection area is needed further including:
    recalculating a second size for the data protection area using current values for size of the first data area, the rate of change, and the retention time;
    determining whether the second size is less than said current size; and
    if the second size is significantly more than the current size, increasing the size of the data protection area to be more than the current size.

18. The non-transitory computer readable storage medium of claim 17, further comprising code that:
  determines an amount of the adjustment if it is determined that an adjustment to the current size is needed.

19. The non-transitory computer readable storage medium of claim 17, wherein said plurality of trigger events include a change to one or more of the retention time, the rate of change, and the first size.

* * * * *